INVENTORS: BEN DAVIES
GEORGE F. CARINI

# United States Patent Office 3,390,002
Patented June 25, 1968

3,390,002
MAGNESITE REFRACTORIES
Ben Davies and George F. Carini, Pittsburgh, Pa.,
assignors to Dresser Industries, Inc., a corporation
of Delaware
Filed June 7, 1966, Ser. No. 555,734
15 Claims. (Cl. 106—58)

ABSTRACT OF THE DISCLOSURE

Burned magnesite shapes consisting essentially of 85% MgO and including at least some each of the materials lime, silica, and phosphorous combined as calcium silicophosphates.

THE PRIOR ART

Figure 1:
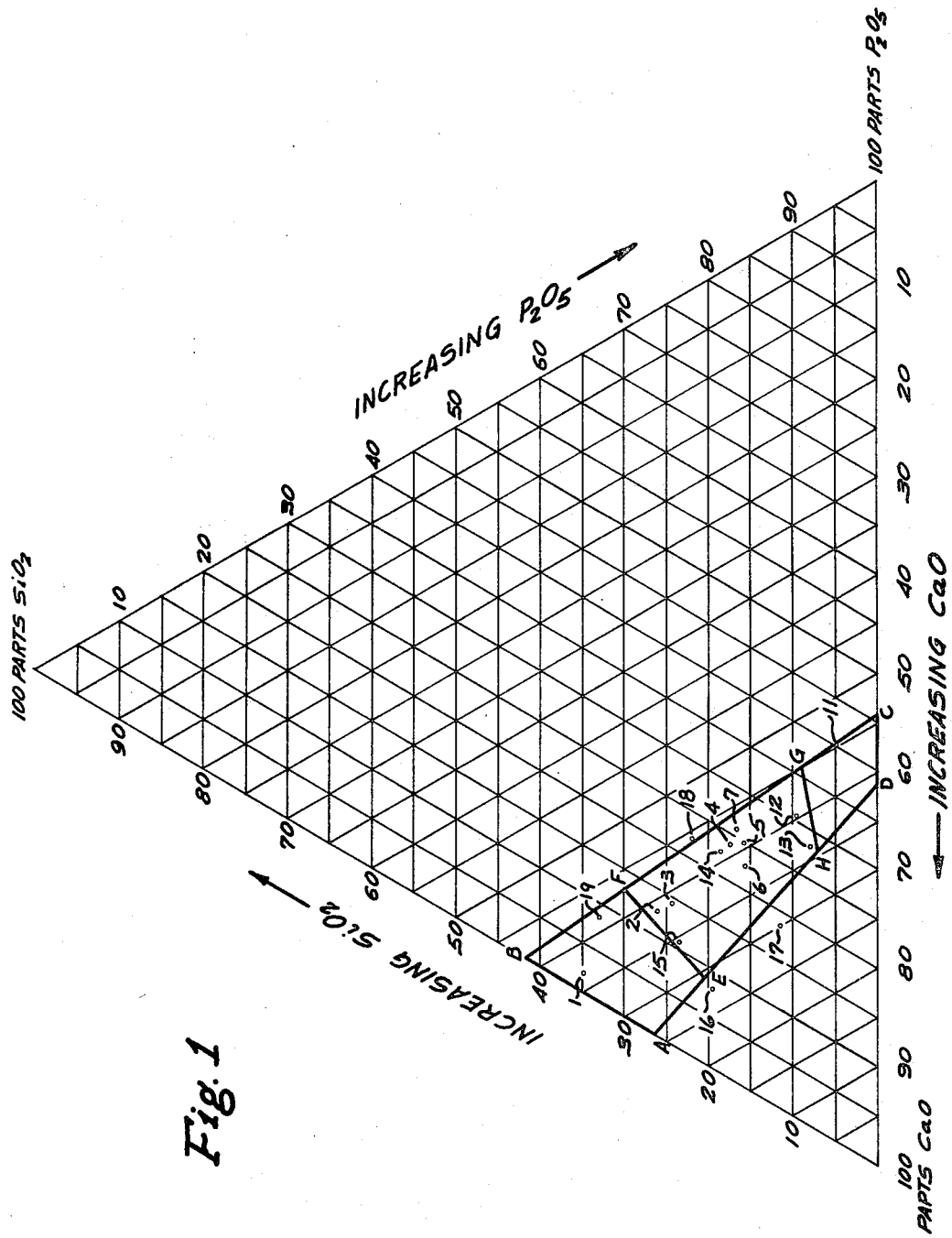

In the oxygen steelmaking process, the furnace structure consists of a metal shell having a refractory lining. In the past, the lining has generally consisted of an inner working lining of tar-bonded, chemically bonded, or burned basic brick, an outer shell lining of burned magnesite brick, and usually an intermediate layer of tar-bonded ramming mix of composition similar to that of the working lining. This invention is primarily concerned with magnesite brick suitable for use in a working lining, but they will have other uses. Typically, the lining of an oxygen converter has been made of basic refractories including such as magnesite brick, because the slag of oxygen steelmaking process is, itself, basic. Magnesite brick have been used most effectively in linings of oxygen vessels as burned, tar-impregnated brick. In addition to resisting slag attack, refractories in oxygen vessels must withstand severe impact, abrasion, and thermal shock due to rapid temperature changes.

Typically, burned magnesite brick, while having very good compressive strengths at elevated temperatures, have been unsatisfactory in resistance to tensile stresses. In recent years, however, considerable progress has been made in improving the high-temperature tensile strength. These advances are described in U.S. Patent No. 3,141,790, to Davies et al., entitled "Burned Basic Refractory Shapes," and application Ser. No. 483,356, filed Aug. 27, 1965, now United States Patent No. 3,275,461 to Davies et al., entitled "Refractory." This invention represents an extension and, in some respects, utilization of those advances and an improvement thereover.

Some recent work regarding testing of phosphates in magnesite brick was reported in "Improved Chemical Bonds for Basic Refractories," by R. W. Limes and R. O. Russell, a paper presented at the American Ceramic Society annual meeting, Philadelphia, Pa., May 3, 1965. In that work, it was found that excellent hot tensile strength at 2300° F. could be obtained by bonding magnesites containing dicalcium silicate with long-chain sodium phosphate glasses. It has now been found, however, that these brick had almost no transverse strength when tested at 2600° F.

Accordingly, it is an object of this invention to provide ceramically bonded shapes having improved tensile strength (measured by transverse loading), particularly suited for use in the fabrication of the lining of an oxygen converter vessel. It is another object of this invention to provide burned magnesite brick containing phosphates which are substantially all calcium silicophosphates, as determined by X-ray diffraction, which brick have excellent tensile strength at 2600 and even at 2900° F.

BRIEF DESCRIPTION

In one aspect, this invention is predicated on the discovery that in burned magnesite shapes consisting of at least 85% MgO, by chemical analysis (weight basis), and less than about 3% $R_2O_3$ ($Al_2O_3+Fe_2O_3+Cr_2O_3$); the presence of CaO, $SiO_2$, and $P_2O_5$ in controlled ratios and percentages increases hot tensile strength. It is essential that at least some each of CaO, $SiO_2$, and $P_2O_5$ be present, and that the sum thereof be at least 2%. In addition to the necessary amounts on a weight basis, they must be in the proportions substantially enclosed by lines A–B–C–D in the FIG. 1 diagram, explained more fully hereafter, and substantially all must be combined as calcium silicophosphates. The presence of these phases, in our work, was determined by X-ray diffraction, which we believe to be the most definitive test, at least as presently advised. Furthermore, it is essential that the percentage $B_2O_3$, on a weight basis, be carefully controlled. The shapes must contain at least about 0.2% $P_2O_5$. Preferably, the proportions of CaO, $SiO_2$, and $P_2O_5$ should be enclosed by lines D–E–F–C in FIG. 1; and, optimally, the proportions should be enclosed by lines E–F–G–H in FIG. 1. It is also preferable that the $R_2O_3$ content be less than about 1.5%. When shapes according to this invention are used in oxygen vessels, it is preferable that they be tar-impregnated.

DETAILED DESCRIPTION

Further features and other objects and advantages will become clear to those skilled in the art by a careful study of the following detailed description. In the detailed description, all sizings are reported by Tyler screen series; all percentages and parts are by weight; chemical analyses were obtained by spectrographic analysis with control by wet chemical analysis, and are reported as oxides in accordance with the common practice in the refractories industry.

The detailed discussion is made with reference to FIG. 1, which is a ternary diagram on which the relative proportions of the CaO, $SiO_2$, and $P_2O_5$ of the exemplary mixes are plotted. Proportions were calculated from the chemical analyses without reference to MgO, or other oxides, the major components of the refractory which, of course, have no influence on the proportions of the CaO, $SiO_2$ and $P_2O_5$.

The FIG. 1 diagram utilizes the principles which characterize all such three-component charts. In the diagram, each side of an equilateral triangle is divided into 100 parts, each fifth part being intersected by lines parallel to each of the other two sides. A point at any corner represents 100 parts, by weight, of one of the three components. For example, in the diagram, the apex represents 100 parts of $SiO_2$; the lower left-hand corner represents 100 parts CaO; and the lower right-hand corner represents 100 parts $P_2O_5$. In any ternary diagram, the three sides are binary systems. For example, a point on the base line is composed exclusively of the lower corner components CaO and $P_2O_5$. The relative distance of a point from each of the three corners may be expressed in parts; and it, thus, may represent a proportionate composition of a ternary mixture.

Figure 2:
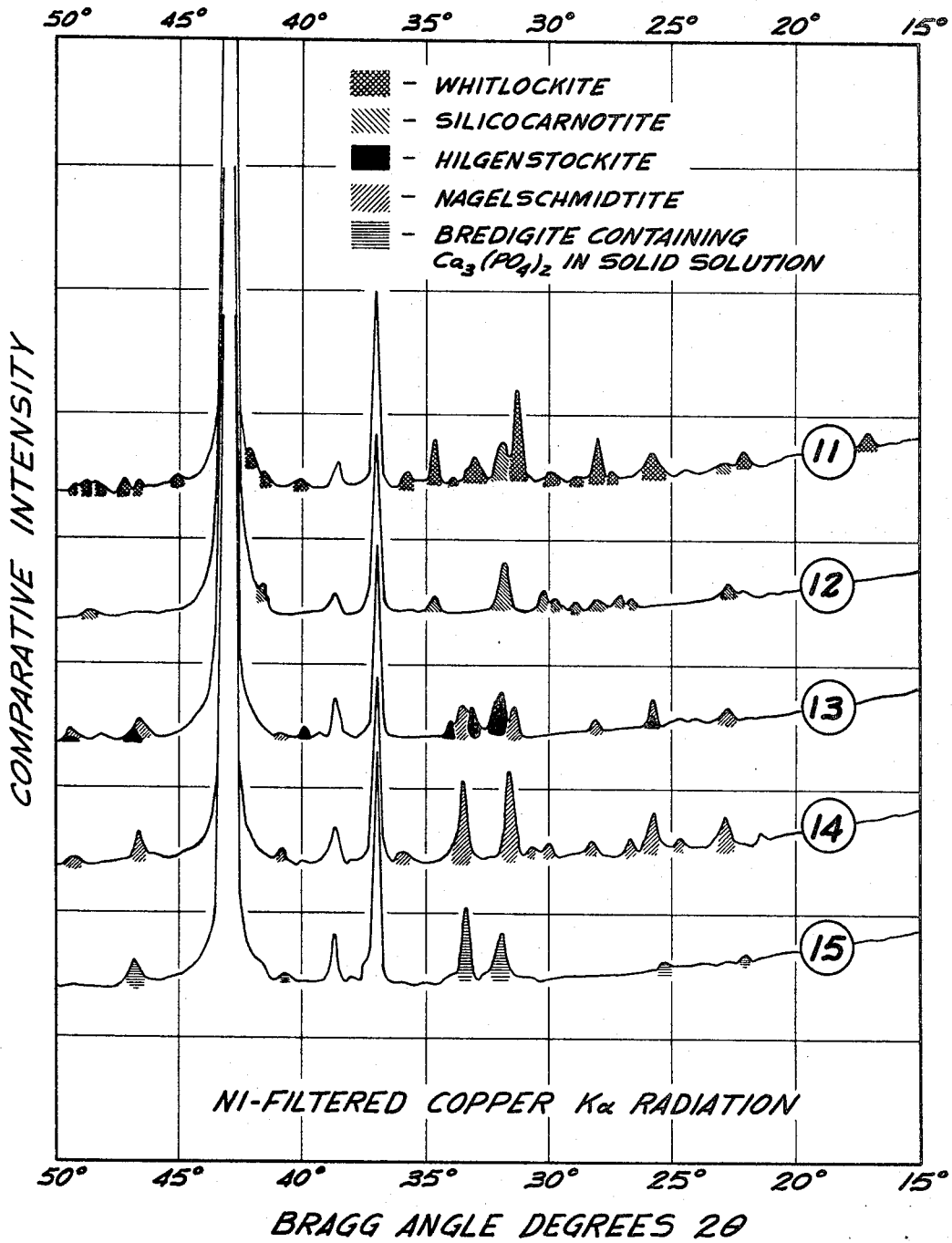

FIG. 2 contains X-ray diffraction patterns of several of the examples hereafter discussed.

FIRST METHOD

One method of making magnesite brick or shapes according to this invention comprises the steps of preparing a batch from size-graded, dead burned magnesite, finely divided silica, lime-yielding materials, and calcium phosphate-yielding materials, tempering said batch with sufficient binder, forming into shapes, and drying and burning. The calcium phosphate-yielding material can be selected, among others, from materials containing the minerals monetite, whitlockite, brushite, fluorapatite, chlorapatite, hydroxylapatite, carbonate-apatite, and isoclasite.

Examples 2 through 6 in Table I were prepared according to this method and, in part, represent an example of the invention. Examples 1 and 1A are examples of prior art burned magnesite brick. The batch ingredients of the various exampes are given in Table I. "Phosphodust," mentioned in the table, is a commercial apatite containing both CaO and $P_2O_5$. The batches were blended in a muller-type mixer and tempered with about 5% lignin liquor binder. Thereafter, they were pressed into brick at about 10,000 p.s.i., dried at about 250° F. for about ten hours, and thereafter burned at about 2800° F., with a hold time of approximately ten hours.

The exemplary brick were then submitted to chemical analysis and X-ray diffraction analysis. They were also tested for tensile strength at room temperature, 2300° F., and 2600° F. Some were tested at 2900° F. (In ceramic materials that are brittle, the modulus of rupture is controlled by tensile strength. Therefore, modulus of rupture is used as a measure of tensile strength.) The results of these tests are given in Table I. The relative proportions of CaO, $SiO_2$, and $P_2O_5$, calculated from the chemical analyses, are also included in the table and are shown on FIG. 1.

TABLE II

| Example | 7 | 8 | 9 | 10 |
|---|---|---|---|---|
| Batch, Percent: | | | | |
| Magnesite A | 95 | 95 | 95 | 95 |
| Phosphodust | 5 | 5 | 5 | 5 |
| Boric Acid | | 0.1 | 0.2 | 0.4 |
| Predominant Accessory Phases (by X-ray diffraction) | (¹) | (¹) | (²) | (²) |
| Relative Proportions of CaO, $SiO_2$ and $P_2O_5$: | | | | |
| CaO | 57.3 | 56.4 | 56.7 | 57.7 |
| $SiO_2$ | 17.0 | 17.2 | 16.8 | 17.2 |
| $P_2O_5$ | 25.7 | 26.3 | 26.5 | 25.1 |
| Bulk Density, p.c.f. | 177 | 177 | 178 | 176 |
| Modulus of Rupture, p.s.i.: | | | | |
| At Room Temperature (Av. 2) | 3,080 | 2,210 | 830 | 2,040 |
| At 2,300° F. (Av. 2) | 1,810 | 1,200 | 740 | 290 |
| At 2,600° F. (Av. 2) | 1,490 | 1,380 | 270 | 80 |
| Chemical Analysis, Percent: | | | | |
| $SiO_2$ | 1.1 | 1.1 | 1.1 | 1.1 |
| $Al_2O_3$ | 0.78 | 0.67 | 0.67 | 0.64 |
| $Fe_2O_3$ | 0.34 | 0.35 | 0.35 | 0.36 |
| CaO | 3.7 | 3.6 | 3.7 | 3.7 |
| MgO | The remainder | | | |
| $P_2O_5$ | 1.66 | 1.68 | 1.73 | 1.61 |
| $B_2O_3$ | 0.05 | 0.09 | 0.15 | 0.22 |

¹ Nagelschmidtite.
² Not determined.

The studies reported in Table II established that as the percentage boron was increased in a magnesite brick containing CaO, $SiO_2$, and $P_2O_5$ substantially all combined as a calicum silicophosphate, the high-temperature tensile strength was destroyed. We believe that the presence of dicalcium silicate, as a mineral or in solid solution with other minerals, controls the effects of $B_2O_3$.

In Examples 7 and 8, the phosphate is combined as

TABLE I

| Example | 1 | 1A | 2 | 3 | 4 | 5 | 6 |
|---|---|---|---|---|---|---|---|
| Batch, Percent: | | | | | | | |
| Magnesite A | 100 | | 98.75 | 98.4 | 95 | 38 | 19 |
| Magnesite B | | | | | | 57 | 76 |
| Magnesite D | | 100 | | | | | |
| Phosphodust (Commercial Apatite) | | | 1.25 | 1.6 | 5.0 | 5.0 | 1.25 |
| Predominant Accessory Phases (by X-ray diffraction): | | | | | | | |
| Example 1 | Bredigite | | | | | | |
| Example 1A | Monticellite and merwinite | | | | | | |
| Example 2 | Bredigite with tricalcium phosphate in solid solution | | | | | | |
| Examples 3,4,5,6 | Nagelschmidtite | | | | | | |
| Relative Proportions of CaO, $SiO_2$ and $P_2O_5$: | | | | | | | |
| CaO | 62.5 | | 61.8 | 61.0 | 59.0 | 60.0 | 62.0 |
| $SiO_2$ | 35.5 | | 26.1 | 24.7 | 17.5 | 15.7 | 15.1 |
| $P_2O_5$ | 2.0 | | 12.1 | 14.3 | 23.5 | 24.3 | 22.9 |
| Bulk Density, p.c.f. | 182 | 178-181 | | 179 | 178 | 174 | 175 |
| Modulus of Rupture, p.s.i.: | | | | | | | |
| At Room Temp. (Av. 2) | 3,150 | 2,000-3,000 | | 3,050 | 2,550 | 2,460 | 3,800 |
| At 2,300° F. (Av. 2) | 1,700 | 150-200 | 1,620 | 1,680+ | 1,620+ | 880 | 500 |
| At 2,600° F. (Av. 2) | 450 | 50-80 | 730 | 920 | 1,510 | 1,220 | 1,000 |
| 2,900° F. Transverse Load Test (50 p.s.i.): Temp. of failure | | | | 2,800 | ¹2,900 | | 2,880 |
| Chemical Analysis, Percent: | | | | | | | |
| $SiO_2$ | 0.93 | 0.9 | 0.95 | 0.93 | 1.1 | 1.1 | 1.1 |
| $Al_2O_3$ | 0.6 | 0.2 | 0.6 | 0.6 | 0.57 | 0.52 | 0.51 |
| $Fe_2O_3$ | 0.35 | 0.3 | 0.41 | 0.35 | 0.35 | 0.35 | 0.38 |
| CaO | 1.6 | 1.0 | 2.25 | 2.3 | 3.7 | 4.20 | 4.5 |
| MgO | The remainder | | | | | | |
| $P_2O_5$ | 0.05 | (²) | 0.44 | 0.54 | 1.47 | 1.70 | 1.66 |
| $B_2O_3$ | 0.06 | 0.12 | 0.06 | 0.06 | 0.05 | 0.10 | 0.10 |

¹ 14 minutes.
² Not tested.

Table I establishes that a controlled amount of lime, silica, and phosphate substantially all combined as calcium silicophosphates, as determined by X-ray diffraction, provides an increase in the hot tensile strength of burned magnesite brick at 2600° F. and 2900° F. Example 1 is typical of brick made according to the teachings of application Ser. No. 483,356, now United States Patent No. 3,275,461 referred to above, and containing 0.05% $P_2O_5$, not added intentionally and, therefore, to be considered an inadvertent trace amount. It was prepared from a magnesite having a careful control of the lime: silica ratio and the percentage of $B_2O_3$. It was and still is considered an outstanding contribution to the refractory art. Notice, however, that this invention represents a striking and unexpected improvement thereover.

Examples 7 through 10, in Table II, were prepared in the same manner as Examples 1 through 6. Small additions of boric acid were made to Examples 8 through 10 to learn the effect of boron.

magelschmidtite. The boron additions to Examples 9 and 10 in some way prevented the formation of nagelschmidtite resulting in the formation of a phase, or phases, unidentifiable by X-ray diffraction. Mixes 9 and 10 are not according to the teachings of this invention.

SECOND METHOD

In another method of practicing this method, there are two burning steps: first, to prepare a prereacted grain, and then to prepare a brick or shape. In this preferred method, shapes are prepared by (1) selecting a batch from materials consisting essentially of dead burned magnesite, caustic magnesia, silica, lime-yielding materials, calcium phosphate-yielding materials; (2) intimately mixing the batch; (3) burning the batch to form a prereacted grain; (4) sizing and grading the grain; (5) tempering with sufficient binder; (6) forming into shapes; (7) drying; and (8) burning.

In a variation of the method just described, the batch is made from a mixture of dead burned magnesite and/or caustic magnesia, silica, lime-yielding materials free of magnesia, and reactive phosphate-yielding materials. In this case, the lime-yielding and phosphate-materials are first combined and allowed to react. Thereafter, the remainder of the batch materials is added. This mixing sequence, or its equivalent, is essential in order that the CaO, $SiO_2$, and $P_2O_5$ will substantially all be present as calcium silicophosphate; and the $P_2O_5$ and $SiO_2$ cannot react with magnesia. By "reactive" phosphates, we mean such as phosphoric acid and the like, which fairly rapidly and easily chemically combine with the CaO constituents in the batches. By lime-yielding materials, we mean such materials as lime hydrate and whiting.

Examples 11 through 15 in Table III were made according to the process in which a prereacted grain is prepared. Examples 11, 13, and 15 were prepared according to the variation described where reactive phosphate-yielding materials are used. The batches of Table III were intimately admixed, which mixing was facilitated by the addition of enough water to form a slurry or paste. The slurry or paste was then dried at 250° F. to remove free water. Thereafter, the dried material was crushed and briquetted. The briquettes were burned at 3140° F. and then made into brick and burned at about 2800° F.

TABLE III

| Example | 11 | 12 | 13 | 14 | 15 |
|---|---|---|---|---|---|
| Batch—100% Special Grain Prepared from— | | | | | |
| Caustic MgO, parts | 100 | 100 | 100 | 100 | 100 |
| Ca(OH)₂ | 11.2 | 5.71 | 6.85 | 3.0 | 4.5 |
| Phosphodust | | | 3.84 | | 1.0 |
| Phosphoric Acid | 12.8 | | | 4.4 | 1.8 |
| Silica | | | | 1.0 | 0.9 |
| Predominant Accessory Phases (by X-ray diffraction): | | | | | |
| Example 11 | Whitlockite and silicocarnotite | | | | |
| Example 12 | Silicocarnotite | | | | |
| Example 13 | Hilgenstockite | | | | |
| Example 14 | Nagelschmidtite | | | | |
| Example 15 | Bredigite containing tricalcium phosphate in solid solution | | | | |
| Relative Proportions of CaO, SiO₂ and P₂O₅: | | | | | |
| CaO | 54.4 | 59.7 | 64.2 | 59.3 | 65.7 |
| SiO₂ | 4.8 | 9.7 | 7.4 | 17.8 | 23.5 |
| P₂O₅ | 40.8 | 30.6 | 28.4 | 22.9 | 10.8 |
| Bulk Density, p.c.f. | 181 | 183 | | 177 | 182 |
| Modulus of Rupture, p.s.i.: | | | | | |
| At Room Temp. (Av. 2) | 3,010 | 2,140 | 2,960 | 2,480 | 2,590 |
| At 2,300° F. (Av. 2) | 3,480 | 710 | 1,040 | 1,660 | 1,640 |
| At 2,600° F. (Av. 2) | 2,000 | 1,150 | 920 | 1,250 | 1,180 |
| 2,900° F. Transverse Load Test (50 p.s.i.): | | | | | |
| Temp. of failure | 2,895 | | ¹2,900 | | |
| Warpage after 30 min., percent | | 1.0 | | 2.2 | 1.8 |
| Chemical Analysis: | | | | | |
| SiO₂ | 0.57 | 0.70 | 0.60 | 1.8 | 1.4 |
| Al₂O₃ | 0.3 | 0.41 | 0.49 | 0.5 | 0.3 |
| Fe₂O₃ | 0.5 | 0.5 | 0.32 | 0.4 | 0.5 |
| CaO | 6.5 | 4.3 | 5.2 | 6.0 | 3.9 |
| MgO | The remainder | | | | |
| P₂O₅ | 4.87 | 2.2 | 2.3 | 2.31 | 0.64 |
| B₂O₃ | 0.06 | 0.10 | 0.08 | 0.07 | 0.11 |

¹ 25 minutes.

The relative proportions of the CaO, $SiO_2$, and $P_2O_5$ in the examples in Table III were selected to demonstrate the calcium silicophosphate phases which are suitable according to the practice of this invention. These phases were determined by X-ray powder diffraction techniques. The X-ray diffraction patterns for Example 11 through 15 are reproduced in FIG. 2. The principal phase detected was, of course, periclase. In Example 11, the predominant calcium silicophosphate phase was whitlockite containing dicalcium silicate in solid solution. Subordinate silicocarnotite was also detected. In Example 12, silicocarnotite was the predominant accessory phase. In Example 13, the predominant accessory phases were hilgenstockite containing dicalcium silicate in solid solution and nagelschmidtite. In Example 14, the predominant accessory phase was nagelschmidtite; and in Example 15, the predominant accessory phase was bredigite containing tricalcium phosphate in solid solution.

The chemical formulas for the minerals referred to above are given in the following table:

Silicocarnotite _____ $5CaO \cdot SiO_2 \cdot P_2O_5$
Nagelschmidtite _____ $7CaO \cdot 2SiO_2 \cdot P_2O_5$
Hilgenstockite _____ $4CaO \cdot P_2O_5$
Whitlockite _____ $3CaO \cdot P_2O_5$
Bredigite _____ $2CaO \cdot SiO_2$ Examples 16 through 19, in Table IV, were prepared in the same manner as Examples 11 through 15 in Table III. They were prepared with CaO, SiO, and $P_2O_5$ in proportions bordering, or just inside, the area A–B–C–D of FIG. 1. However, they are not according to the teachings of this invention.

TABLE IV

| Example | 16 | 17 | 18 | 19 |
|---|---|---|---|---|
| Batch—100% Special Grain Prepared from— | | | | |
| Caustic MgO, parts | 100 | 100 | 100 | 100 |
| Ca(OH)₂ | 2.8 | 4.3 | 1.0 | 3.3 |
| Phosphodust | | | 5.1 | 1.8 |
| Phosphoric Acid | .36 | 1.8 | | |
| Silica | | | | 1.45 |
| Predominant Accessory Phases (by X-ray diffraction): | | | | |
| Example 18 | | | Silicocarnotite | |
| Example 19 | | | | Bredigite containing tricalcium phosphate in solid solution and merwinite (minor) |
| Relative Proportions of CaO, SiO₂ and P₂O₅: | | | | |
| CaO | 72.3 | 69.8 | 56.0 | 58.5 |
| SiO₂ | 19.8 | 11.7 | 22.4 | 33.7 |
| P₂O₅ | 7.9 | 18.5 | 21.4 | 7.8 |
| Bulk Density, p.c.f. | | | 180 | 185 |
| Modulus of Rupture, p.s.i.: | | | | |
| At Room Temp. (Av. 2) | 3,320 | 2,960 | 3,120 | 3,780 |
| At 2,300° F. (Av. 2) | 480 | 1,040 | 520 | 2,130 |
| At 2,600° F. (Av. 2) | 210 | 310 | 30 | 20 |
| Chemical Analysis: | | | | |
| SiO₂ | 0.63 | 0.57 | 1.4 | 1.9 |
| Al₂O₃ | 0.48 | 0.50 | 0.4 | 1.0 |
| Fe₂O₃ | 0.35 | 0.41 | 0.4 | 0.3 |
| CaO | 2.3 | 3.4 | 3.5 | 3.3 |
| MgO | The remainder | | | |
| P₂O₅ | 0.25 | 0.9 | 1.35 | 0.44 |
| B₂O₃ | 0.09 | 0.09 | 0.046 | 0.065 |

Table IV establishes that it is essential to control the relative proportions of CaO, $SiO_2$, and $P_2O_5$. Examples 16 and 17 are too high in lime. They were found to contain low-melting calcium aluminates and calcium ferrites. Example 19 was apparently too low in lime. Actually, it was intended that Example 18 would be made according to this invention; but, through inadvertent pickup of silica in the batching and mixing, it fell outside of the acceptable CaO, $SiO_2$, and $P_2O_5$ proportions. In Example 19, a minor amount of low-melting merwinite was detected. Thus, Example 19 indicated that mere control of the batch was not enough. The proper mineral must also form.

The mixes contained in Table V are exemplary of the work done by Limes and Russell, referred to above, where magnesites were bonded with long-chain sodium phosphate glasses. Magnesite B is high in lime and mix 21, which uses it, has good strength at 2300° F.; whereas, magnesite C, low in lime, provided a brick which proved very weak at 2300° F. Neither brick had good strength at 2600° F. X-ray diffraction indicated that the soda and phosphate were combined with lime in the brick to form calcium-sodium-phosphates.

Figure 5:
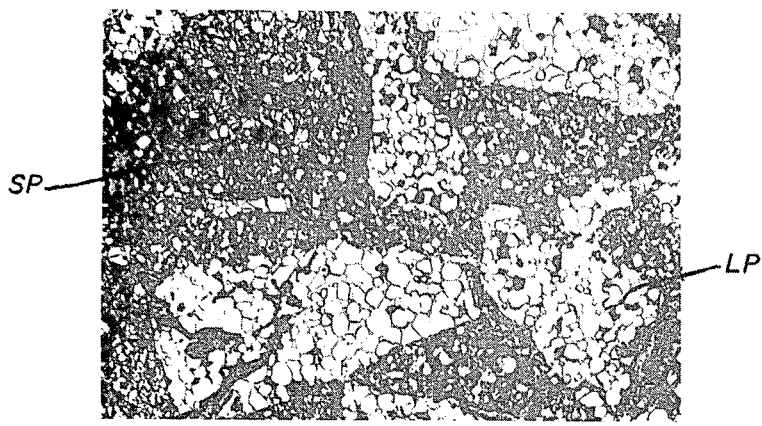
Figure 4:
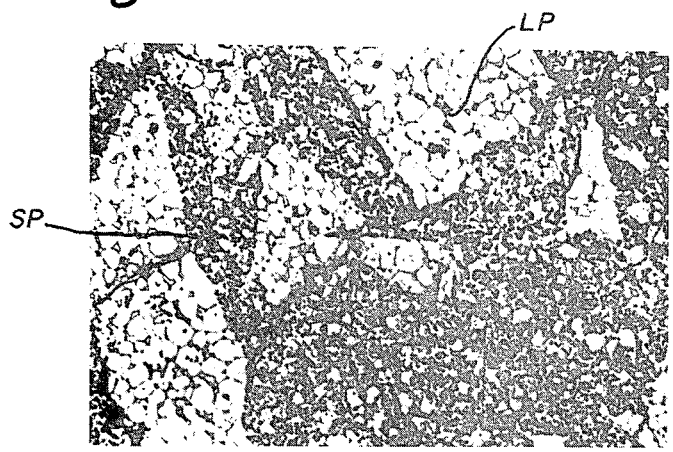
Figure 3:
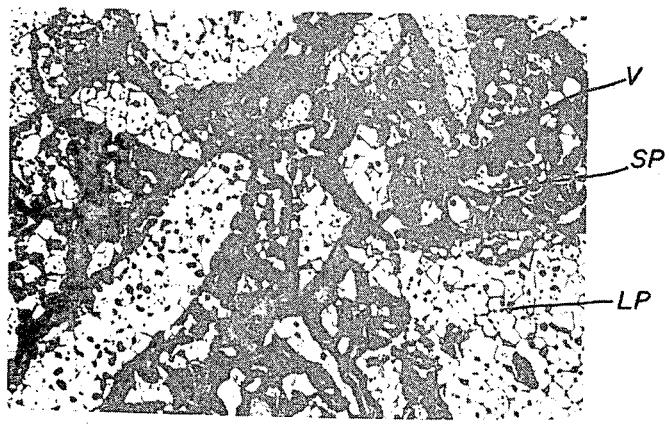

FIGS. 3, 4, and 5 are photomicrographs of polished sections of Examples 18, 12, and 14, respectively. They are not etched or otherwise treated. The figures are enlarged 59 times. FIG. 3, a photomicrograph of Example 18, which is not according to this invention, shows large periclase grains (LP) surrounded with a matrix of smaller periclase grains (SP) and large void spaces (V). FIGS. 4 and 5, photomicrographs of Examples 12 and 14 made according to this invention, show large periclase grains (LP) surrounded by a matrix of uniformly-distributed smaller periclase grains (SP) without large voids. We believe this uniformly-distributed matrix without large void spaces contributes to the excellent hot strength of these examples and that the distribution is related to the presence of calcium silicophosphates.

TABLE V

| Example | 20 | 21 |
|---|---|---|
| Batch, Percent: | | |
| Magnesite B | 100 | |
| Magnesite C | | 100 |
| Sodium Phosphate (Glass H)[1] | 4 | 4 |
| Predominant Accessory Phases (by X-ray Diffraction): | | |
| Example 20 | Tricalcium sodium phosphate | |
| Example 21 | Forsterite and dicalcium sodium phosphate | |
| Relative Proportions of CaO, SiO$_2$ and P$_2$O$_5$: | | |
| CaO | 50.9 | 19.7 |
| SiO$_2$ | 18.2 | 54.1 |
| P$_2$O$_5$ | 30.9 | 26.1 |
| Bulk Density, p.c.f. | 182 | 178 |
| Modulus of Rupture, p.s.i.: | | |
| At Room Temp. (Av. 2) | 1,970 | 1,620 |
| At 2,300° F. (Av. 2) | 1,900 | 210 |
| At 2,600° F. (Av. 2) | 100 | 100 |
| Chemical Analysis: | | |
| SiO$_2$ | 1.0 | 3.3 |
| Al$_2$O$_3$ | 0.5 | 0.5 |
| Fe$_2$O$_3$ | 0.26 | 0.53 |
| CaO | 2.8 | 1.2 |
| MgO | The remainder | |
| P$_2$O$_5$ | 1.7 | 1.6 |
| B$_2$O$_3$ | 0.06 | 0.04 |
| Na$_2$O$_3$ | 0.70 | 0.62 |

[1] Product of FMC Corporation.

THIRD METHOD

Another method of practicing this invention comprises the steps of preparing a binder batch of lime, silica, lime-yielding and phosphate-yielding materials being, on a calcined basis, substantially within the proportions enclosed by lines A–B–C–D in FIG. 1. The binder batch is intimately mixed and, thereafter, burned to form a prereacted binder material. This material is ball-milled and added to a size-graded, dead burned magnesite brick batch. The brick batch is tempered with sufficient binder, formed into shapes, dried, and burned.

Summarizing the mineralogical aspects of this invention, it was found essential that the CaO, SiO$_2$, and P$_2$O$_5$ must be substantially all combined as calcium silicophosphates. When the percentage B$_2$O$_3$ was excessive, calcium silicophosphate minerals were not detected by X-ray diffraction (see Table II). When soda was present, calcium sodium phosphates were detected (see Table V). The presence of excessive lime resulted in the formation of low-melting calcium aluminates and ferrites. Too little CaO resulted in the formation of low-melting calcium-magnesium-silicates (see Table IV). It should be understood that shapes can be made with CaO, SiO$_2$, and P$_2$O$_5$ ratios somewhat outside those enclosed within lines A–B–C–D in FIG. 1, which shapes have predominant accessory phases, as determined by X-ray diffraction, which are calcium silicophosphates. However, these shapes do not have the high tensile strength at 2600 and 2900° F., and are not within the purview of this invention.

RAW MATERIALS AND TEST PROCEDURES

The typical chemical analyses of some of the raw materials used in the examples are given in the following table. The silica was substantially all SiO$_2$.

| | Magnesite A, percent | Magnesite B, percent | Magnesite C, percent | Magnesite D, percent | Phospho-dust |
|---|---|---|---|---|---|
| SiO$_2$ | .70 | .66 | 3.0 | 0.9 | 5.0 |
| Al$_2$O$_3$ | .60 | 0.62 | 0.3 | 0.2 | 1.7 |
| Fe$_2$O$_3$ | | | 0.6 | 0.3 | 0.9 |
| CaO | 1.4 | 2.44 | 1.4 | 1.0 | 48.8 |
| MgO | 97.25 | 96.28 | 94.7 | 97.5 | 0.5 |
| P$_2$O$_5$ | | | | | 33.8 |
| B$_2$O$_3$ | 0.05 | | | 0.12 | |
| Alkalies | | | | | 0.35 |
| F | | | | | 1.2 |

The typical size grading of the refractory batches used in preparation of the examples was as follows:

| | Percent |
|---|---|
| Pass 4 on 10 mesh | 25 |
| Pass 10 on 28 mesh | 30 |
| Pass 28 on 65 mesh | 10 |
| Minus 65 mesh | 35 |
| Minus 325 mesh | 20 |

The bulk density of the examples was determined by ASTM Method C134–41, Manual of ASTM Standards on Refractory Materials, 9th edition (1963), pages 154 et seq. Modulus of rupture at room temperature was determined by ASTM Method C133–55, pages 145 et seq., of the same manual; modulus of rupture at 2300 and 2600° F. was determined similarly to modulus of rupture at room temperature, except that the test is performed in an electrically-heated furnace. In no case is the depth of the test samples less than 1½ inches.

The 2900° F. transverse load test is a special test: 1 x 1 x 7 inch specimens are cut from brick and set across a 5-inch span. A load required to give a modulus of rupture of 50 p.s.i. is placed on the specimens. The specimens are heated within an electrically-heated furnace at 2200° F. at 200°/hr. and, thereafter, at 100°/hr. to 2900° F. or failure temperature. If the sample does not fail after thirty minutes at 2900° F., its warpage is measured and reported.

PHASE STUDIES

Standard X-ray powder diffraction procedures[1] were followed in the qualitative determination of the phase composition of the refractory test specimens.

A General Electric XRD–5 X-ray Diffractometer unit equipped with spectrogoniometer, gas-flow proportional counter, and potentiometric strip-chart recorder was used. Powder mounts were scanned in the angular range 5° to 70° 2θ using Ni-filtered Cu Kα radiation. Instrument settings were: tube voltage 50 kv.; tube current 13.5–15.5 ma.; input discriminator 2.5 v.; beam slit 3°; receiving slit 0.2°; time constant 2 seconds; recorder range 2000 counts per second; and scanning speed 2° 2θ per minute.

Interplanar ($d$) spacings and relative intensities of reflections were determined from diffraction patterns by calculation using tables[2] of interplanar spacings as a function of 2θ and by visual estimation with a calibrated scale. Identification of the diffracting phases was effected following a standardized procedure[1] in which $d$ values and relative intensities were compared with published diffraction data and reference patterns. The primary reference source for powder diffraction data was the Powder Diffraction File, published by The American Society for Testing Materials (1964). The Numerical (Hannawalt), Alphabetical (Davey), and Fink indexes to the Powder Diffraction File were used. Additional diffraction data was obtained from published scientific papers.[3]

The preferred composition and the best mode now known for the practice of the present invention is embodied in Example 4 of Table I.

Having thus described the invention in detail and with sufficient particularity as to enable those skilled in the art to practice it, what is desired to have protected by Letters Patent is set forth in the following claims.

We claim:
1. In a burned magnesite shape consisting essentially of at least 85% MgO, less than about 3% R$_2$O$_3$, the improvement comprising said shape including essentially at least some each of the materials CaO, SiO$_2$ and P$_2$O$_5$,

---
[1] Klug, H. P., and L. E. Alexander, X-ray Diffraction Procedures for Polycrystalline and Amorphous Materials, John Wiley and Sons, New York, 716 pp. (1954).
[2] Switzer, G., and others. "Tables of $d$ Spacings for Angle 2θ," Circular 29, U.S. Department of the Interior, Washington, D.C. (1948).
[3] Nagelschmidt (1937), Bredig (1942, 1943), and Nurse, Welch, and Gutt (1959).

on an oxide basis, the sum of the CaO, $SiO_2$ and $P_2O_5$ being at least 2% of the total weight of the shape and in substantially the proportions enclosed by lines A–B–C–D in FIG. 1, there being at least about 0.2% $P_2O_5$, the $P_2O_5$ being determined by X-ray diffraction to be substantially all combined as calcium silicophosphates and the quantity, if any, of $B_2O_3$ present being maintained sufficiently low such that the shapes after burning have a modulus of rupture at 2600° F. in excess of 500 p.s.i.

2. Shapes according to claim 1 in which dicalcium silicate is present both as a mineral and in solid solution with phosphate compounds and the relationship of the $B_2O_5$ and dicalcium silicate is such that the shapes after burning have a modulus at 2600° F. in excess of 500 p.s.i.

3. Shapes according to claim 1 in which total $R_2O_3$ is less than about 1.5%, by weight, of the shapes.

4. Shapes according to claim 1 in which the proportions of CaO, $SiO_2$ and $P_2O_5$ are enclosed by lines D–E–F–C of FIG. 1.

5. Shapes according to claim 1 in which the proportions of CaO, $SiO_2$ and $P_2O_5$ are enclosed by lines E–F–G–H of FIG. 1.

6. Shapes according to claim 1 in which the predominant calcium silicophosphate phase, as determined by X-ray diffraction, is nagelschmidtite.

7. Shapes according to claim 1 in which the predominant calcium silicophosphate phase, as determined by X-ray diffraction, is silicocarnotite.

8. Shapes according to claim 1 in which the predominant calcium silicophosphate phase, as determined by X-ray diffraction, is whitlockite containing dicalcium silicate in solid solution.

9. Shapes according to claim 1 in which the predominant calcium silicophosphate phase, as determined by X-ray diffraction, is bredigite containing tricalcium phosphate in solid solution.

10. Shapes according to claim 1 in which the predominant calcium silicophosphate phase, as determined by X-ray diffraction, is hilgenstockite, containing dicalcium silicate in solid solution.

11. Shapes according to claim 1 impregnated throughout with a non-aqueous cokeable carbonaceous material.

12. Method of making burned magnesite refractories shapes including the steps of:
 (1) preparing a batch consisting essentially of at least 85% MgO, less than 3% $R_2O_3$, at least some each of CaO, $SiO_2$ and $P_2O_5$, the sum of the CaO, $SiO_2$ and $P_2O_5$ being at least 2% and in the proportions enclosed by lines A–B–C–D in FIG. 1, the quantity, if any, of $B_2O_3$ being maintained sufficiently low to obtain a modulus of rupture after burning of said shapes of at least 500 p.s.i. at 2600° F., the $P_2O_5$ content being added to the batch in a form capable of yielding calcium phosphate in the batch,
 (2) intimately mixing the batch,
 (3) burning the batch to form a prereacted grain,
 (4) crushing and sizing the grain,
 (5) forming the crushed grain into brick,
 (6) burning said brick.

13. That method of preparing burned magnesite refractory shapes of superior strength at 2600 F., comprising the steps of preparing a size graded refractory brickmaking batch comprising dead burned magnesite, silica, and calcium phosphate yielding materials, said batch at least about 85%, by weight, on a calcined basis MgO, said batch comprising essentially at least some of each of the materials CaO, $SiO_2$ and $P_2O_5$, by weight on a calcined oxide basis, the sum of the CaO, $SiO_2$ and $P_2O_5$ being at least 2% and in substantially the proportions enclosed by lines A–B–C–D in FIG. 1, there being at least about 0.2% $P_2O_5$, the $P_2O_5$ being combined as calcium silicophosphates and the quantity, if any, of $B_2O_3$ present being maintained sufficiently low to obtain a modulus of rupture after burning of said shapes of at least 500 p.s.i. at 2600° F., forming the batch into shapes, burning the shapes.

14. A method of making burned magnesite shapes comprising the steps of:
 (1) preparing a binder batch of materials yielding CaO, $SiO_2$ and $P_2O_5$ on a calcined basis in substantially the proportions enclosed by lines A–B–C–D in FIG. 1,
 (2) intimately mixing the binder batch,
 (3) burning the batch to form a prereacted binder material,
 (4) comminuting the binder material,
 (5) adding comminuted binder material to a size graded, dead burned magnesite to make a brickmaking batch, the resulting batch consisting essentially of at least 85% MgO, less than about 3% $R_2O_3$, essentially at least some each of CaO, $SiO_2$, $P_2O_5$, the sum of the CaO, $SiO_2$ and $P_2O_5$ amounting to at least 2% and in the proportions enclosed by lines A–B–C–D in FIG. 1, the quantity, if any, of $B_2O_3$ being maintained sufficiently low to obtain a modulus of rupture after burning of said shapes of at least 500 p.s.i. at 2600° F.,
 (6) tempering the brickmaking batch,
 (7) forming the batch into shapes,
 (8) drying and burning the shapes.

15. The method according to claim 13 in which the calcium-phosphate yielding material is selected from materials containing minerals selected from the group consisting essentially of monetite, whitlockite, brushite, fluorapatite, chlorapatite, hydroxylapatite, carbonateapatite and isoclasite.

References Cited

UNITED STATES PATENTS

| | | | |
|---|---|---|---|
| 3,141,790 | 7/1964 | Davies et al. | 106—63 |
| 3,275,461 | 9/1966 | Davies et al. | 106—58 |
| 3,285,758 | 11/1966 | Limes et al. | 106—58 |

TOBIAS E. LEVOW, *Primary Examiner.*

JAMES E. POER, *Examiner.*